US012775458B2

(12) United States Patent
Nagamalla et al.

(10) Patent No.: US 12,775,458 B2
(45) Date of Patent: Oct. 27, 2026

(54) PROCESSING WEB PLATFORM SOURCE CODE TO DETERMINE PRESENCE OF ONE OR MORE EMBEDDED DIGITAL PRODUCT TOOLS

(71) Applicant: Capital One Services, LLC, McLean, VA (US)

(72) Inventors: Sai Sandeep Nagamalla, Bangalore (IN); Gaurav Goyal, Bangalore (IN); Srinivas Kumar, Bengaluru (IN); Sharanya Halady, Bengaluru (IN)

(73) Assignee: Capital One Services, LLC, McLean, VA (US)

( * ) Notice: Subject to any disclaimer, the term of this patent is extended or adjusted under 35 U.S.C. 154(b) by 283 days.

(21) Appl. No.: 18/760,793

(22) Filed: Jul. 1, 2024

(65) Prior Publication Data

US 2025/0335165 A1 Oct. 30, 2025

(30) Foreign Application Priority Data

Apr. 26, 2024 (IN) ............................. 202441033291

(51) Int. Cl.
*G06F 8/70* (2018.01)

(52) U.S. Cl.
CPC ..................................... *G06F 8/70* (2013.01)

(58) Field of Classification Search
None
See application file for complete search history.

(56) References Cited

U.S. PATENT DOCUMENTS

| | | | | |
|---|---|---|---|---|
| 8,589,411 | B1 * | 11/2013 | Sung | G06F 8/33 707/804 |
| 9,767,169 | B1 * | 9/2017 | Paff | G06F 16/9038 |
| 2003/0221167 | A1 * | 11/2003 | Goldstein | G06F 16/9577 715/201 |
| 2008/0072210 | A1 * | 3/2008 | Rush | G06F 8/71 717/121 |
| 2010/0106705 | A1 * | 4/2010 | Rush | G06F 8/36 707/723 |
| 2011/0072000 | A1 * | 3/2011 | Haas | G06F 16/951 707/E17.108 |
| 2011/0225115 | A1 * | 9/2011 | Moitra | G06F 16/951 706/50 |
| 2013/0036129 | A1 * | 2/2013 | Havel | G06F 8/70 707/E17.03 |

(Continued)

*Primary Examiner* — Qing Chen
(74) *Attorney, Agent, or Firm* — Foley & Lardner LLP

(57) ABSTRACT

Systems and methods for processing web platform source code to determine presence of one or more embedded digital product tools. In some aspects, the system is configured to receive navigation information associated with a web platform, extract source code of a first page, determine a hosting configuration template matching the web platform, determine navigation information for a plurality of search result pages of the web platform, extract source code of a search result page from the plurality of search result pages, determine that at least one search string, of a plurality of search strings associated with the target digital product tool, is included in the source code of the search result page, identify a first provider of the target digital product tool based on the at least one search string, and generate for display an indication of the target digital product tool and the identified first provider.

20 Claims, 4 Drawing Sheets

(56) References Cited

U.S. PATENT DOCUMENTS

| | | | | |
|---|---|---|---|---|
| 2014/0013304 | A1* | 1/2014 | Vangala | G06F 8/75<br>717/123 |
| 2014/0089894 | A1* | 3/2014 | Elshishiny | G06F 8/70<br>717/120 |
| 2014/0108418 | A1* | 4/2014 | Elbaum | G06F 8/70<br>707/769 |

* cited by examiner

PROCESSING WEB PLATFORM SOURCE CODE TO DETERMINE PRESENCE OF ONE OR MORE EMBEDDED DIGITAL PRODUCT TOOLS

CROSS-REFERENCE TO RELATED APPLICATIONS

This application claims the benefit of priority of Indian Provisional Patent No. 202441033291, filed Apr. 26, 2024. The content of the foregoing application is incorporated herein in its entirety by reference.

SUMMARY

Web platforms or sites with different page formats can cause excessive time consumption for users searching for digital product tools (e.g., virtual assistants) and related information (e.g., tool developers, available web platforms, embedded web features, etc.) as they may not be familiar with different navigation structures for those web platforms. As one example, some web platforms may include individual profile pages for providers (e.g., external collaborators or developers) of digital product tools on the platform, while other web platforms may prefer citing providers on a single dedicated web page (e.g., a list of organization names or logos). As another example, with respect to identifying the provider of a digital product tool, users may face some difficulty as identifiable provider information may be hidden from initial view and may instead be buried within source code (e.g., JavaScript) of the web platform. For example, such information may be accessible only through developer tools on a web browser.

Accordingly, methods and systems are described herein for retrieving information for digital product tools across one or more web platforms. As one example, methods and systems are described herein for view augmentation by using a web platform navigator to identify relevant web pages with information for a digital product tool (e.g., based on one or more key search phrases or terms related to the digital product tool or the tool provider). With respect to conventional systems for retrieving digital product tool information, a system may individually locate web pages relevant to the digital product tool and subsequently identify the desired information on those pages. As indicated above, in one scenario, where a web platform has multiple pages for different digital product tools and their corresponding providers, a page-by-page search may cause the system to spend considerable time navigating the web platform. To further compound this problem, in the scenario where the system is not familiar with a web platform, the system is expected to spend additional time adjusting to new web navigation formats and searching through irrelevant web pages. In another scenario, with respect to information hidden from an initial web page view, although web platforms may provide substantial information for digital product tools on the web page, the conventional system may still be unable to acquire desired information from, e.g., embedded source code of the web page. Furthermore, in cases where the system needs to perform a similar process for gathering information on multiple digital product tools across different web platforms, the time to complete such a task may grow significantly.

In some aspects, with respect to the context of identifying relevant web pages for digital product tools, the web platform navigator may match a web platform navigation structure with a known web hosting configuration (e.g., base link templates for web pages) to construct address links to web pages with information relevant to the digital product tools. Upon navigating to a web page using the address links, the web platform navigator can extract the underlying source code for the web page. Using the extracted source code, a feature identifier can identify a provider of the digital product tools based on search terms related to the tool or the provider. In additional embodiments, the feature identifier can search the source code for functional information (e.g., embedded web features) of the digital product tool. In one use case, for example, where a web platform hosts a virtual assistant tool to aid users in navigating its web services, the feature identifier can record information regarding the developers and embedded web features of the virtual assistant (e.g., responding to frequently asked questions, directing to a specific page, providing a service call number). In this way, the system (including the web platform navigator and the feature identifier) may reduce the time that users spend searching for digital product tool information, which can enable users to be more productive and spend time analyzing the retrieved information.

In some embodiments, upon receiving information for digital product tools, the system may update a graphical user display that visually summarizes the relationship between digital product tools, web platforms, and tool providers. In one use case, for example, the graphical user display can show one or more icons representative of digital product tools, providers, or web platforms, and generate a graphical link between the icons to signify their underlying relationships. As an example, the system may receive information from a web platform that hosts two different digital product tools developed by two different providers. As such, the system can update the graphical user display to show a web platform icon linked to two different digital product tool icons and each digital product tool icon linked to a provider icon. In additional embodiments, the system may update the graphical user display in real time as new digital product tool information is received from new searches of web platforms. Thus, the system provides the user with not only an automated process for retrieving digital product tool information from web platforms but also a streamlined user experience.

In some embodiments, the system may process web platform source code to determine presence of one or more embedded digital product tools. By way of example, the system can receive navigation information associated with a web platform hosting a target digital product tool. In response to the received navigation information, the system may further extract, based on the navigation information associated with the web platform, source code of a first page of the web platform. Further, the system can determine, based on the source code of the first page, a hosting configuration template matching the web platform. Based on the determined hosting configuration template, the system can determine navigation information for a plurality of search result pages of the web platform. For each search result page of the plurality of search result pages, the system can further (i) extract, based on the navigation information for the plurality of search result pages, a source code of the search result page, (ii) determine that at least one search string, of a plurality of search strings associated with the target digital product tool, is included in the source code of the search result page, and (iii) identify a first provider of the target digital product tool based on the at least one search string. In response to identifying the first provider of the target digital product tool, the system can generate for display an indication of the target digital product tool and the identified first provider.

In some aspects, the systems and methods described herein provide for a system that causes operations including receiving navigation information associated with a web platform hosting a target digital product tool; extracting, based on the navigation information associated with the web platform, source code of a first page of the web platform; determining, based on the source code of the first page, a hosting configuration template matching the web platform; determining, based on the hosting configuration template, navigation information for a plurality of search result pages of the web platform; for each search result page of the plurality of search result pages: extracting, based on the navigation information for the plurality of search result pages, source code of the search result page, determining that at least one search string, of a plurality of search strings associated with the target digital product tool, is included in the source code of the search result page, and identifying a first provider of the target digital product tool based on the at least one search string; and generating for display an indication of the target digital product tool and the identified first provider.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
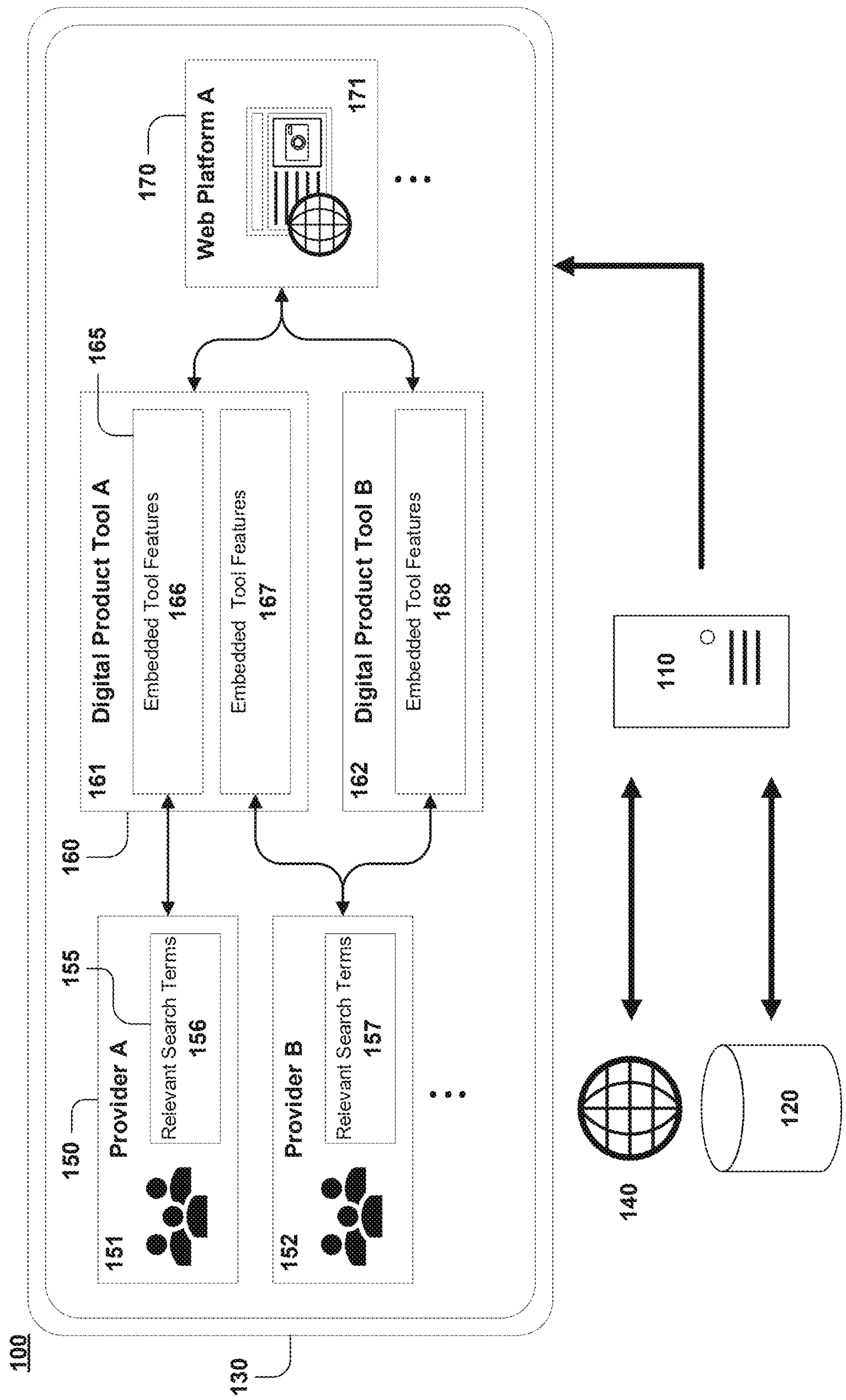
FIG. 1 shows a system for displaying digital product tool information retrieved from one or more web platforms, in accordance with one or more embodiments.

FIG. 1 shows a system for displaying digital product tool information retrieved from one or more web platforms, in accordance with one or more embodiments. As shown in FIG. 1, system 100 may include a computer system 110, a database 120, a graphical user interface 130, an online network server 140, or other components. Computer system 110 may be communicatively coupled to database 120, graphical user interface 130, or online network server 140 to access, modify, or store data across one or more components. Graphical user interface 130 may include any type of mobile terminal, fixed terminal, or other device. By way of example, graphical user interface 130 may include a desktop computer, a notebook computer, a tablet computer, a smartphone, a wearable device, or other client device. Online network server 140 may facilitate communication between computer system 110 and web data via any type of network communication service. For example, online network server 140 may enable computer system 110 to access web data (e.g., web pages, web source code) using a wireless Internet, an ethernet, or other service. It should be noted that, while one or more operations are described herein as being performed by components of computer system 110, those operations may, in some embodiments, be performed by other components of computer system 110 or other components of system 100. As an example, while one or more operations are described herein as being performed by components of computer system 110, those operations may, in some embodiments, be performed by components of graphical user interface 130. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 may implement functionality for retrieving characteristic information (e.g., web tool features, software provider) of digital product tools that are hosted on a web platform (e.g., a website). As an example, in response to a user request for digital product tool information, system 100 may implement a standardized method for efficiently identifying, retrieving, or consolidating available tool data from host web platforms. For instance, system 100 may identify a hosting configuration corresponding to an internal navigation structure used by the web platform hosting the digital product tool. In response to identifying the hosting configuration, system 100 may apply the internal navigation structure of the web platform to perform an accelerated search for web pages relevant to the digital product tool. As an example, system 100 may identify a pattern of web page addresses (e.g., URL links) used by the web platform to narrow the search to web pages that have the highest likelihood of including information related to the digital product tool. From each web page, system 100 may retrieve characteristic information (e.g., embedded web features) of the digital product tool and store the retrieved data into database 120. In some embodiments, system 100 may analyze the characteristic information to determine relational information (e.g., identified developers of the digital product tool) that is also stored in database 120. Accordingly, system 100 may repeat the above-described method with new digital product tools that are hosted on web platforms using different navigation structures without external guidance.

With respect to conventional systems, a system may individually locate web pages of a web platform without regard for an underlying navigation structure. For example, a conventional system may perform a simple page-by-page search of each available web page on a website. As such, the conventional system may analyze numerous web pages that are not relevant to the digital product tool, thus wasting significant time and computing resources. By contrast, system 100 may accept a hosting configuration for the web platform to narrow navigation to web pages that are relevant to the digital product tool, resulting in reduced search tasks and improved time efficiency. Further, system 100 may determine navigation structures of various web platforms with different hosting configurations in a standardized manner. As an example, system 100 may distinguish hosting configurations between different web platforms that use different navigation structures. As such, system 100 may implement the above-described time efficient search method with minimal difficulty despite variance across web platforms and corresponding navigation structures.

In some embodiments, system 100 may update graphical user interface 130 to visually represent characteristic (e.g., web page features), or relational (e.g., tool provider, hosting web platform), information of digital product tools. As an example, system 100 may generate a user interface element (e.g., an icon, a selectable item) corresponding to a digital product tool that displays information (e.g., text descriptions, link to web pages) for web-based services provided by the digital product tool. In some cases, system 100 may generate a user interface element corresponding to a provider of the digital product tool, or a web platform, that displays identifiable details (e.g., relevant topics, search terms) and relationship information (e.g., developer, host) with respect to the digital product tool. In some cases, system 100 may display graphical connections (e.g., connecting lines) between user interface elements (e.g., for digital product tool, providers, or web platforms) to represent relational (e.g., providers of a digital product tool, web platform hosts of a digital product tool) information.

In some embodiments, system 100 may modify the display of graphical user interface 130 based on user-specified commands. For example, system 100 may receive a user selection to display only certain types of relationships (e.g., graphical connections between user interface elements) found between digital product tools, providers, or web platforms. In some cases, system 100 may receive a user selection to display specific types of user interface elements (e.g., digital product tool, web platform, provider). As an example, system 100 may, upon user selection, display user interface elements and graphical relationships for web platforms hosting digital product tools and providers of the digital product tools, but not the digital product tools themselves.

In other embodiments, system 100 can update graphical user interface 130 in real time as new digital product tool information is retrieved and stored onto database 120. As an example, system 100 may identify, for a web platform hosting a digital product tool, a second web platform hosting the same digital product tool. In response, system 100 may update graphical user interface 130 to display a new user interface element corresponding to the second web platform and a graphical connection between the new user interface element and a user interface element corresponding to the digital product tool. As such, system 100 may provide a fast and responsive user interface that provides up-to-date information about presence of digital product tools on web platforms.

As described above, system 100 may be used to display profile or relational information of digital product tool providers on graphical user interface 130. In disclosed embodiments, a provider element 150 may include an icon, a selectable geometry, or other representations displayed on graphical user interface 130. In some embodiments, the provider element 150 may comprise identifiable information (e.g., an official name, organization logo, reference links to web sources) of a digital product tool provider. In some embodiments, the provider element 150 may comprise relevant search terms 156, 157 (e.g., key words, phrases) used to determine profile or relational information of providers from web content (e.g., web pages, web source code). As an example, system 100 may analyze text descriptions on a web page for a digital product tool for inclusion of relevant search terms 156, 157 to find identifiable provider information for the digital product tool. In some embodiments, the provider element 150 may comprise embedded user interface elements 155 for displaying identifiable provider information or provider-relevant search terms 156, 157.

In some embodiments, the provider element 150 may include a graphical connection (e.g., a line connector) to a digital product tool element 160 or a web platform element 170 to represent a source (e.g., author/distributor of digital product tool) or a partnership (e.g., collaborator of web platform) relationship, respectively. As an example, a provider element 151 for a first provider (e.g., "Provider A") may include a graphical connection to a digital product tool element 161 for a first digital product tool (e.g., "Digital Product Tool A") to signify that the first provider is an issuer of the first digital product tool. Additionally, a second provider element 152 for a second provider (e.g., "Provider B") may include a graphical connection to the digital product tool element 161 to signify that the second provider is a collaborative issuer of the first digital product tool alongside the first provider. Further, the second provider element 152 may include a graphical connection to a second digital product tool element 162 for a second digital product tool (e.g., "Digital Product Tool B") to signify that the second provider is an issuer of both the first and second digital product tools. By way of another example, the first provider element 151 may include a graphical connection to a web platform element 171 for a web platform (e.g., "Web Platform A") that hosts the first and the second digital product tools to signify that the first provider is a collaborator of the web platform. Similarly, the second provider element 152 may include a graphical connection to the web platform element 171 to signify that the second provider is another collaborator of the web platform.

As described above, system 100 may be used to display characteristic or relational information of digital product tools on graphical user interface 130. In disclosed embodiments, a digital product tool element 160 may include an icon, a selectable geometry, or other representations displayed on graphical user interface 130. In some embodiments, the digital product tool element 160 may comprise identifiable information (e.g., an official name, an image, reference links to web sources) of a digital product tool. In some embodiments, the digital product tool element 160 may comprise descriptive information (e.g., text-based narratives, image screenshots) of one or more embedded web features 166, 167, 168 provided by the digital product tool. In some cases, the digital product tool element 160 may further comprise web source code samples (e.g., JavaScript) that correspond to the embedded web features 166, 167, 168 of the digital product tools.

In some embodiments, the digital product tool element 160 may comprise embedded user interface elements 165 for displaying identifiable digital product tool information or embedded web features 166, 167, 168. In some embodiments, the digital product tool element 160 may include a graphical connection (e.g., a line connector) to a provider element 150 or a web platform element 170 to represent a product (e.g., creation of a tool provider) or a content (e.g., embedded features of web platform) relationship, respectively. As an example, a digital product tool element 161 for a digital product tool (e.g., "Digital Product Tool A") may include a graphical connection to a provider element 151 for a first provider (e.g., "Provider A") to signify that the digital product tool is issued by the first provider. Additionally, the digital product tool element 161 may include a graphical connection to a second provider element 152 for a second provider (e.g., "Provider B") to signify that the digital product tool is issued jointly by the first and the second providers (e.g., first provider issues a first portion of the first digital product tool and second provider issues a second portion of the first digital product tool). By way of another example, the digital product tool element 161 may include a graphical connection to a web platform element 171 for a web platform (e.g., "Web Platform A") to signify that the digital product tool is hosted (e.g., accessible to online users) on the web platform.

As described above, system 100 may be used to display identifiable or relational information of digital product tool hosting web platforms on graphical user interface 130. In disclosed embodiments, a web platform element 170 may include an icon, a selectable geometry, or other representations displayed on graphical user interface 130. In some embodiments, the web platform element 170 may comprise identifiable information (e.g., an official name, website address, platform owner, available web services, hosting configuration) of a web platform. In some embodiments, the web platform element 170 may include a graphical connection (e.g., a line connector) to a provider element 150 or a digital product tool element 160 to represent a partnership (e.g., collaborator of web platform) or a host (e.g., providing access to digital product tool features) relationship, respectively, as discussed above.

Figure 2:
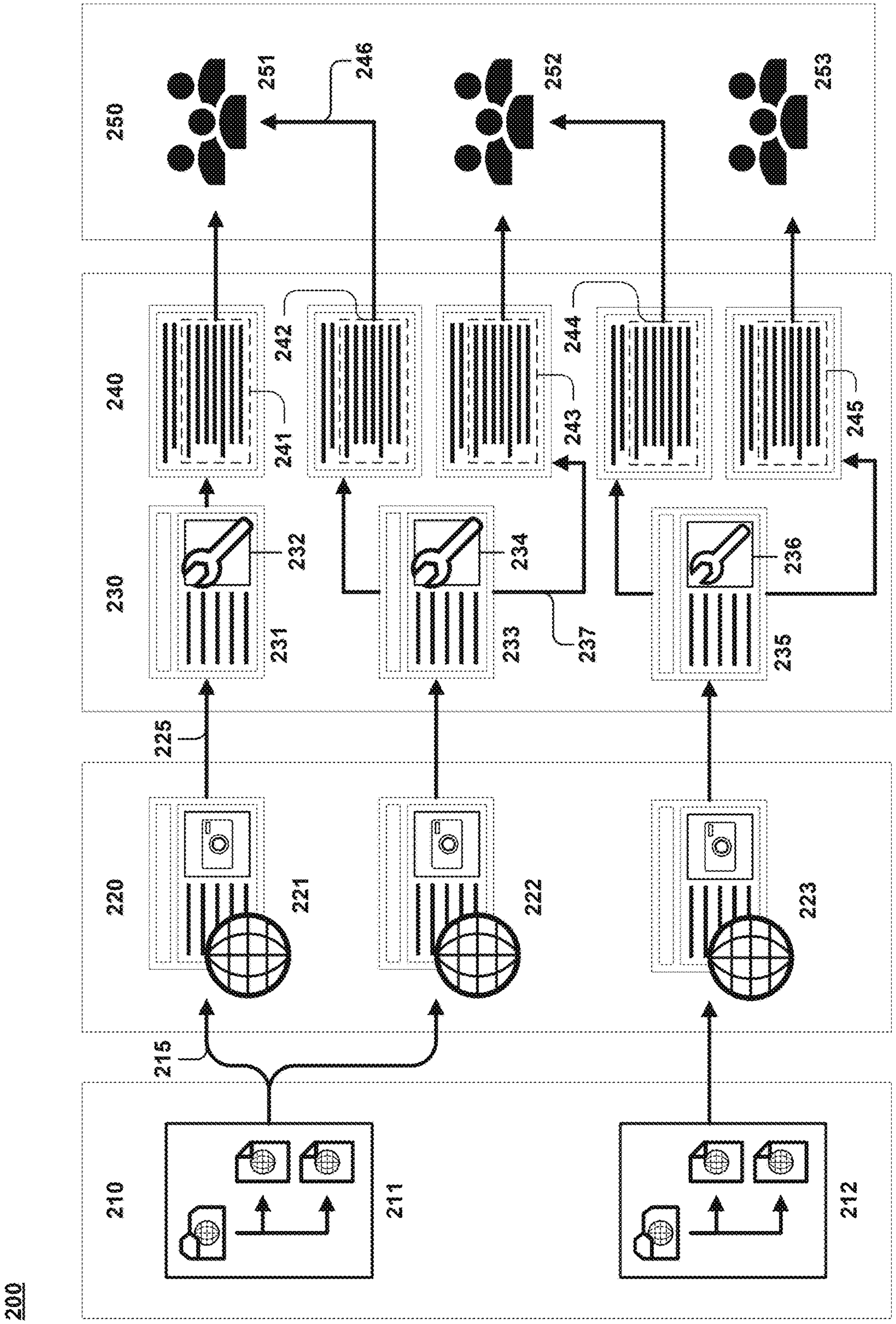
FIG. 2 shows a standardized web navigation structure for retrieving digital product tool information, in accordance with one or more embodiments.

FIG. 2 shows a standardized web navigation structure for retrieving digital product tool information, in accordance with one or more embodiments. As shown in FIG. 2, navigation structure 200 may include a web hosting configuration 210, a web platform 220, a search result page 230, and a web source code 240. As discussed herein, navigation structure 200 may enable system 100 to efficiently identify and retrieve characteristic, or relational, information of a digital product tool from one or more web pages of a web platform. In some embodiments, system 100 may use navigation structure 200 to determine provider information 250 (e.g., an official name, organization logo, reference links to website or profile page) of a provider of the digital product tool. As an example, system 100 may identify a web hosting configuration 210 that includes navigation structures (e.g., URL address templates) for one or more web pages of a web platform 220. Using the navigation structures, system 100 may determine one or more search result pages 230 of the web platform that are relevant to the digital product tool. Upon navigating to a search result page 230, system 100 may identify feature details or provider information 250 of the digital product tool. In some cases, system 100 may access web source code 240 of the search result page 230 to identify embedded web features (e.g., code snippets corresponding to a particular web function) of the digital product tool. In response to retrieving characteristic, or relational, information of the digital product tool, system 100 may store the information onto database 120 and update graphical user interface 130 as described above. As such, by using navigation structure 200 to target web pages relevant to the digital product tool, system 100 may reduce the number of web pages analyzed to retrieve sufficient information, and thus avoid reliance on an inefficient page-to-page search method as used in conventional systems.

In some embodiments, the systems and methods described herein may be applied in the context of digital tools and products (e.g., leads navigation tool, payment calculator, etc.) provided by online automobile dealerships. As an example, system 100 may be configured to search web pages of frequently visited automobile dealership websites and retrieve information regarding available features and providers of several web-based auto financing tools. Additionally, system 100 may update graphical user interface 130 to display a graphical model representative of available digital products and tools currently in use by online automobile dealerships. As such, graphical use interface 130 may visualize (e.g., using graphical connections) presence of digital auto financing tools, and their providers, on one or more auto dealership websites.

System 100 may identify a web hosting configuration 210 of a web platform 220 as indicated by process 215 of navigation structure 200. In disclosed embodiments, a web hosting configuration 210 may include a standard template for organizing web pages of a web platform 220 into a predictable navigation structure. As an example, a web platform 223 may use a hosting configuration 212 for web navigation structure and organization of one or more web pages from the web platform 223. In some embodiments, the web hosting configuration 210 may comprise a set of address link templates from which additional search terms or address components (e.g., strings of text separated by slashes) are appended onto the end of the link. In some embodiments, the web hosting configuration 210 may comprise a reference to a known website provider or host (e.g., wix.com, blogspot.com, wordpress.com), including known website structures or patterns of the website providers. In some embodiments, the web hosting configuration 210 may comprise one or more source code templates (e.g., boilerplate HTML, JavaScript files) of web pages. In some embodiments, the web hosting configuration 210 may include a common template for organizing web pages that is shared across multiple web platforms 220. As an example, a first web platform 221 and a second web platform 222 may share the same hosting configuration 211 for web navigation structure and organization of one or more web pages on each respective web platform.

In some embodiments, system 100 may determine the web hosting configuration 210 by retrieving template records of common website providers from database 120. For example, by determining a template record of a website provider, the system may access web address link templates corresponding to common web pages found on websites that use the website provider. As such, the system may specify web address links that have relevant information regarding a digital product tool without exploring the entire web platform, thus reducing the total number of explored pages necessary during a search. Additionally, or alternatively, the system may determine the web hosting configuration 210 by identifying key search terms related to a website provider (e.g., an official name) within source code for a sample web page of the web platform. In response to identifying the key search terms, the system may determine a matching website template that is recorded in database 120 or accessible online. For example, by identifying key search terms associated with a website provider, the system may retrieve a recorded copy of the website template from database 120 or access a publicly available website template from the website provider online. Additionally, or alternatively, the system may determine the web hosting configuration 210 by matching source code for sample web pages of the web platform to recorded source code templates (e.g., corresponding to a website provider) in database 120. For example, by comparing source code structure of sample web pages of the web platform to known source code templates, the system may identify a website provider with a high likelihood of sharing web navigation patterns with the web platform.

System 100 may determine one or more search result pages 230 based on the web hosting configuration 210 as indicated by process 225 of navigation structure 200. As an example, system 100 may identify a search result page 231 of web platform 221 by generating custom address links based on link templates from hosting configuration 211. Similarly, system 100 may identify a search result page 233 of web platform 222 by generating custom address links based on similar link templates from hosting configuration 211 as both web platforms 221, 222 are based on the web navigation structure of hosting configuration 211. In a further example, system 100 may identify a search result page 235 of web platform 223 by generating custom address links based on link templates from a different hosting configuration 212, as web platform 223 is based on a different web navigation structure from hosting configuration 211 for web platforms 221, 222. In disclosed embodiments, a search result page 230 may include textual descriptions, embedded web features 232, 234, 236, and provider information 251, 252, 253 of digital product tools. In some embodiments, the search result page 230 may comprise source code (e.g., HTML, JavaScript files) information of embedded web features. In some embodiments, the search result page 230 may comprise reference information regarding a digital product tool provider. In some embodiments, the search result page 230 may comprise user-interactable features of the digital product tool.

In some embodiments, system 100 may determine the search result page 230 by appending navigation structure patterns of a website provider onto a main page URL of the web platform. For example, by appending the website provider page structure patterns onto the main page URL, the system may use information of valid search result pages from other web platforms of the same website provider (e.g., different websites that use the same navigation structure) to predict valid search result pages for the current web platform. Additionally, or alternatively, the system may determine the search result page 230 by generating custom web addresses (e.g., URL links) of search result pages for the web platform. For example, by generating custom web addresses (e.g., URL links) based on appending key search terms related to the digital product tool onto the set of address link templates of the web hosting configuration 210, the system may predict valid search result pages that comprise relevant information (e.g., embedded web features, provider information) about the digital product tool. In some embodiments, system 100 may extract provider information 250 of a digital product tool provider from the search result page 230 by identifying key search terms corresponding to the digital product tool or the provider, as indicated by process 246 of navigation structure 200.

In some embodiments, system 100 may use a web source code 240 of a search result page 230 as indicated by process 237 of navigation structure 200. In disclosed embodiments, a web source code 240 may include a snapshot of web browser scripts (e.g., HTML, JavaScript) that enable the display and functionality of the digital product tool on the search result page 230. In some embodiments, the web source code 240 may comprise one or more functional scripts (e.g., JavaScript) that enable user-interactable web features of the digital product tool. In some embodiments, the web source code 240 may comprise structural scripts (e.g., HTML) that define the contents of the search result page 230, including information related to the digital product tool. In some embodiments, the web source code 240 may comprise an image-based snapshot of the source code, or additional image-based files, that are used in the display of the search result page (e.g., a company or tool logo).

In some embodiments, the system may determine a web source code 240 by accessing developer tools (e.g., a developer console) available on web browsers that provide an endpoint access to actively used scripts for displaying a web page. For example, by programmatically accessing actively used browser scripts on the developer window, the system may automate retrieval of web page source code, which may include detailed information about the digital product and/or a provider. Additionally, or alternatively, the system may use the web source code 240 to determine portions of source code (e.g., associated with different web features) that match one or more search terms corresponding to the digital product tool or provider. For example, by determining specific portions of source code that relate to the digital product tool, the system may identify specific web functionalities (e.g., user-interactable web features) of the digital product tool. As another example, system 100 may determine that a portion 241 of source code for search result page 231 of a first web platform 221 includes provider information 251 corresponding to a first provider. Similarly, system 100 may determine that a portion 242 of source code for search result page 233 of a second web platform 222 includes provider information 251 corresponding to the first provider. Additionally, system 100 may determine that a portion 243 of source code for the same search result page 233 of second web platform 222 includes separate provider information 252 corresponding to a second provider. In further examples, system 100 may determine that a first portion 244 and a second portion 245 of source code for a search result page 235 of a third web platform 223 includes first provider information 252 and second provider information 253 corresponding to the second provider and a third provider, respectively.

Figure 3:
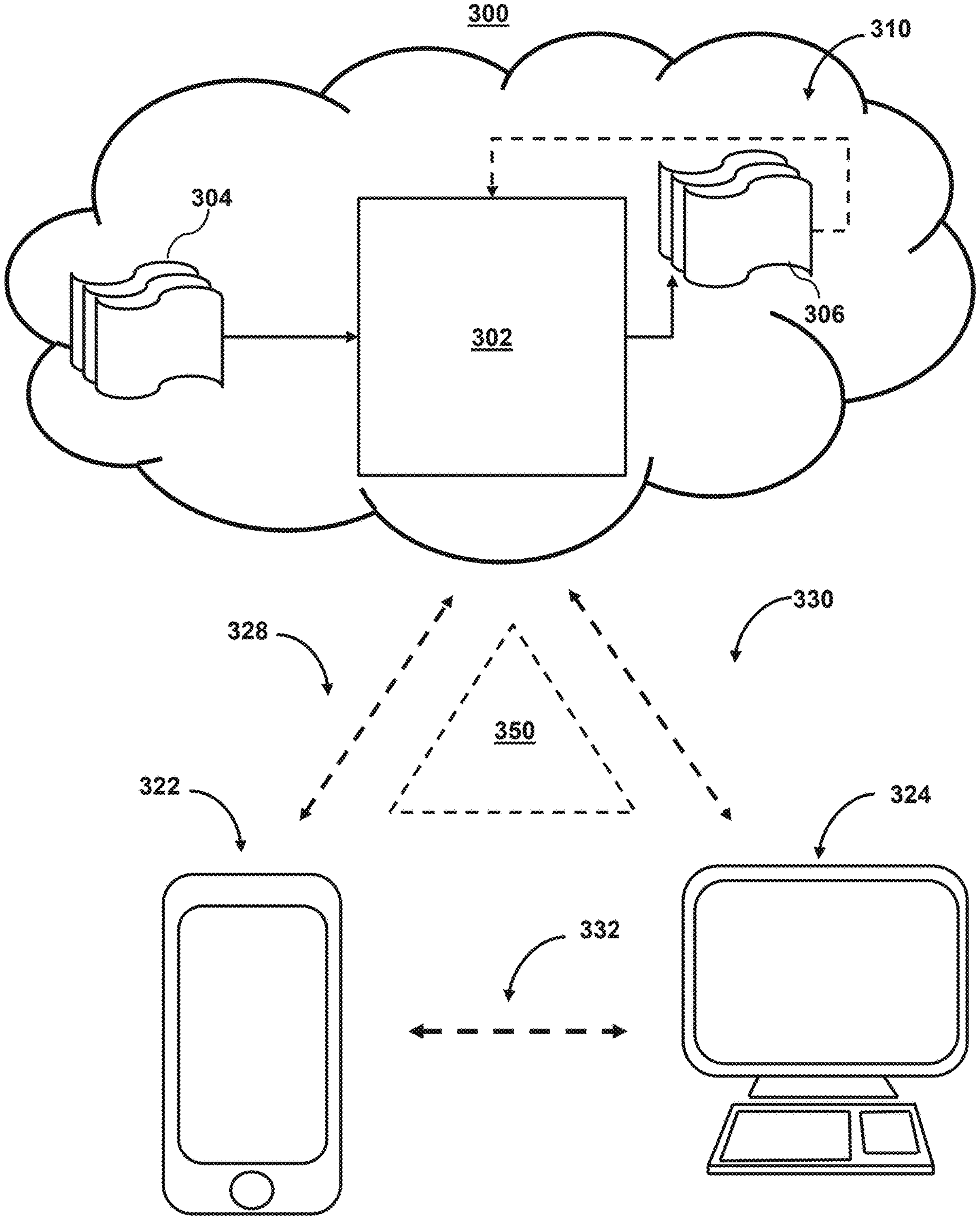
FIG. 3 shows illustrative components for a system used to retrieve digital product tool information across one or more web platforms, in accordance with one or more embodiments.

FIG. 3 shows illustrative components for a system used to retrieve digital product tool information across one or more web platforms, in accordance with one or more embodiments. For example, FIG. 3 may show illustrative components for identifying a web hosting configuration 210 for a web platform 220, accessing search result pages 230 of digital product tools based on the web hosting configuration 210, downloading web source code 240 of the search result pages 230, and identifying digital product information (e.g., embedded web features, provider information 250) from the web source code 240. In other embodiments, FIG. 3 may show illustrative components for displaying the retrieved digital product tool information onto a graphical user interface 130.

As shown in FIG. 3, system 300 may include mobile device 322 and user terminal 324. While shown as a smartphone and a personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational responses, queries, and/or notifications).

Additionally, although mobile device 322 and user terminal 324 are shown as a touchscreen smartphone and a personal computer, respectively, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, computing devices may be implemented by a cloud of computing platforms operating together as the computing devices.

Cloud components 310 may include a computing system 110, a database 120 (e.g., including recorded data for navigation structures 200), or a network server 140. In some embodiments, the computing system 110 of the cloud components 310 may be communicatively coupled to a graphical user interface 130.

Cloud components 310 may access web platforms (e.g., websites) via the network connection to access web pages of web platforms, web source codes, and download source codes.

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., determining that a portion of web source code for a search result page is, or is not, relevant digital product tool information based on search terms related to the tool or the tool provider).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., embedded web features, provider information, or other categories of digital product tool information).

In some embodiments, the model (e.g., model 302) may automatically perform actions based on outputs 306. In some embodiments, the model (e.g., model 302) may not perform any actions. The output of the model (e.g., model 302) may be used to locate specific portions of web source code that correspond to relevant digital product details. As an example, system 300 may use model 302 to analyze web source code 240 (e.g., HTML files, JavaScript files) and identify portions (e.g., lines or variables of source code) that relate to embedded feature details of a digital product tool or information on the digital product tool provider.

System 300 also includes application programming interface (API) layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API platforms and their modules. API layer 350 may use a developer portal. API layer 350 may use strong security constraints applying WAF and DDoS protection, and API layer 350 may use RESTful APIs as standard for external integration.

Figure 4:
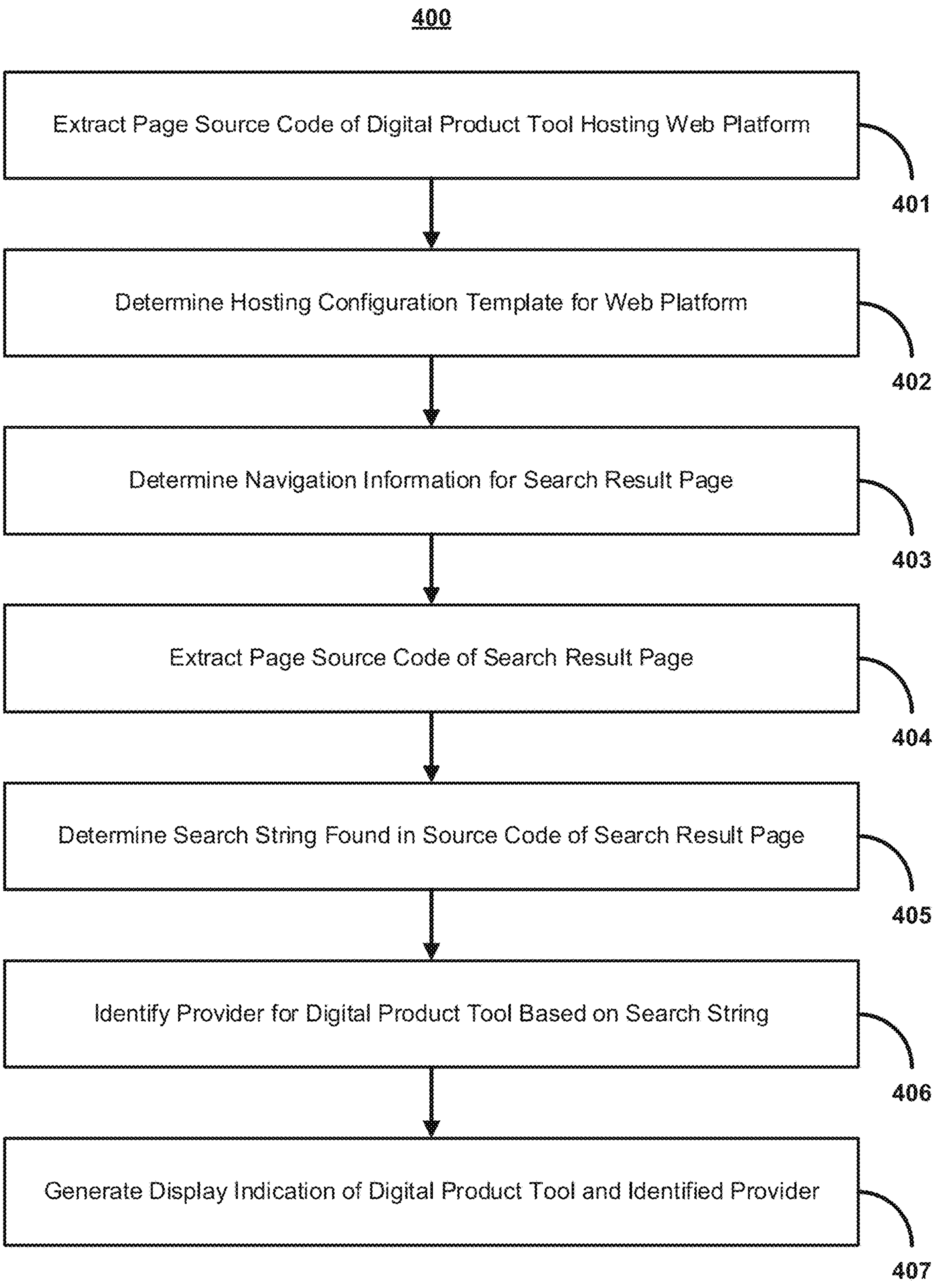
FIG. 4 shows a flowchart of the steps involved in retrieving digital product tool information across one or more web platforms, in accordance with one or more embodiments.

FIG. 4 shows a flowchart of the steps involved in retrieving digital product tool information across one or more web platforms, in accordance with one or more embodiments. For example, the system may use process 400 (e.g., as implemented on one or more system components described above) in order to efficiently identify and retrieve characteristic, or relational, information of a digital product tool by selectively accessing web pages relevant to the digital product tool using an identified navigational structure for the web platform.

At step 401, process 400 (e.g., using one or more components described above) may determine source code for an initial web page of a web platform that hosts a digital product tool. For example, the system may navigate to a first page of a web platform hosting a target digital product tool and extract a web source code corresponding to the first page. As an example, the system may navigate to a main page (e.g., website landing page) and download a copy of the publicly accessible web source code (e.g., HTML or JavaScript scripts). By doing so, the system may systematically determine identifiable features (e.g., a website host service name) from the source code and find a matching web hosting configuration template for the web platform.

In some embodiments, the system may retrieve navigation information associated with the web platform to determine the initial web page (e.g., for extracting web source code). For instance, the system may retrieve web addresses (e.g., URL links) corresponding to one or more candidate web pages of the web platform, from which the system may select the initial web page. As an example, the system may perform an online web search (e.g., via a search engine) of key search terms (e.g., legal name of web platform) associated with the web platform and receive candidate web addresses directed to web pages with high likelihood (e.g., based on a similarity score between web addresses and search terms) of being a web page of the web platform. In response to the received candidate web addresses, the system may select a subset of valid web addresses based on a predetermined similarity threshold (e.g., a static float point value) between the web addresses and the search terms, a maximum number of candidate web addresses considered, or both. By doing so, the system may minimize false positive (e.g., candidate web address that is considered a web page of the web platform when it is not) and false negative (e.g., candidate web address that is not considered a valid web address when it is) determination of valid web addresses of the web platform.

At step 402, process 400 (e.g., using one or more components described above) may determine a hosting configuration template for the web platform. For example, the system may use the retrieved source code of the first page from step 401 to determine a hosting configuration template matching the web platform. As an example, the system may identify a website host provider within portions of the source code that establishes the navigation structure for the web platform. In response to identifying the website host provider, the system may retrieve a set of web link templates (e.g., sourced from the navigation structure of the website host provider) associated with one or more web pages hosted on the web platform. By doing so, the system may use existing web platform templates to predict the type of web pages that are on the web platform and how web pages of the web platform may be interconnected.

At step 403, process 400 (e.g., using one or more components described above) may determine navigation information for one or more search result pages. For example, the system may use the determined hosting configuration template from step 402 to determine navigation information for a plurality of search result pages of the web platform. As an example, the system may use website templates or patterns of common website providers (e.g., a web page directory/tree) to construct URL web addresses that direct to one or more search result pages (e.g., that have relevance to the digital product tool) of the web platform by appending website provider-specific patterns (e.g., strings of text separated by slashes) to a main page URL of the web platform. By doing so, the system may specify a subset of web pages on the web platform with relevance to the digital product tool, thus reducing the number of web pages that need to be analyzed and improving search efficiency.

At step 404, process 400 (e.g., using one or more components described above) may extract source code for a search result page. For example, the system may use the navigation information for the plurality of search result pages from step 403 to extract a source code of a search result page from the plurality of search result pages. As an example, the system may navigate to a search result page of a digital product tool using a generated web address (e.g., from the hosting configuration link templates) and download a copy of the publicly available web page source code (e.g., HTML, JavaScript files that are accessible via web browser developer tools). By doing so, the system may employ a non-invasive method (e.g., analyzing publicly available information) for identifying key details of the digital product tool, a digital product tool provider, or the web platform from the source code.

At step 405, process 400 (e.g., using one or more components described above) may determine that a search string is found within the source code of the search result page. For example, the system may determine that at least one search string, from a plurality of search strings associated with the target digital product tool, is identified within the extracted source code of the search result page from step 404. As an example, the system may retrieve a plurality of search strings associated with the target digital product tool including an identification number, a source code variable name, an official name, a category, an embedded feature description, a set of metadata tags, profile information of the identified first provider, or any combination thereof. Further, the system may analyze the extracted source code of the search result page to detect a portion of the source code that matches with at least one search string from the plurality of search strings. By doing so, the system may employ a standardized search method for efficiently and consistently locating relevant digital product tool information in real time.

At step 406, process 400 (e.g., using one or more components described above) may identify a provider of the digital product tool based on the determined search string. For example, the system may identify a first provider of the target digital product tool based on the at least one search string from step 405. As an example, the system may search the contents of the extracted source code (e.g., lines of code written in JavaScript, HTML, or the like) from step 404 to identify information with high similarity to the search string associated with a digital product tool provider. By doing so, the system may systematically search for provider information from the source code, and thus follow a consistent procedure for locating relevant digital product tool information (e.g., provider information, web feature details) in a non-invasive manner (e.g., using publicly accessible source code).

In some embodiments, process 400 may include identifying embedded web features of the target digital product tool. For example, the system may identify an embedded source code of the target digital product tool (e.g., a provider-issued portion of web source code that implements the digital product tool on the web page) from a source code of a second page of the web platform. In response to identifying the embedded source code, the system may determine a set of embedded web features of the target digital product tool that enable the target digital product tool to interact with a user interface of the web platform. In some cases, the set of embedded web features may include a communication interface, a search result filter, a database search, a digital item comparison and evaluation tool, an exchange authenticator, a web platform navigation assistant, an alert notification tool, or any combination thereof. By doing so, the system may retrieve both characteristic (e.g., web features) and relational (e.g., provider) information of the target digital product tool.

At step 407, process 400 (e.g., using one or more components described above) generates a display indication of the target digital product tool and the identified provider. For example, the system may generate for display an indication of the target digital product tool and the identified first provider from step 406. As an example, the system may generate for display a graphical mapping between user interface elements corresponding to the target digital product tool and the identified first provider as described above. In some cases, the system may generate for display a graphical mapping between the identified first provider and the set of embedded web features of the target digital product tool. By doing so, the system may visually summarize the relationship between digital product tools and tool providers.

In some embodiments, the system may determine a second provider of the target digital product tool. As an example, the system may identify a second provider of the target digital product tool that is separate from the identified first provider based on at least one search string from step 405. In response to identifying the second provider, the system may identify an embedded source code of the target digital product tool in the source code of the second page of the web platform. In response to identifying the embedded source code, the system may determine a first and a second subset of embedded web features of the target digital product tool each corresponding to the identified first provider and the identified second provider, respectively. Further, the system may generate for display a first graphical mapping between the identified first provider and the first set of embedded web features and a second graphical mapping between the identified second provider and the second set of embedded web features. By doing so, the system may visually summarize the relationship between a single digital product tool and multiple tool providers.

In some embodiments, the system may identify a second digital product tool issued by the identified provider of the target digital product tool. As an example, the system may access a provider database (e.g., as part of database 120) comprising a plurality of provider records, each record mapping an identified provider to a recorded digital product tool (e.g., from previous search of web platforms). Using the accessed provider database, the system may identify a provider record of the identified first provider in the provider database that maps the identified first provider to a recorded digital product tool. In response to identifying the recorded digital product tool, the system may generate for display a first graphical mapping between the identified first provider and the target digital product tool and a second graphical mapping between the identified first provider and the first recorded digital product tool (e.g., a second digital product tool displayed alongside the target digital product tool). By doing so, the system may visually summarize the relationship between several digital product tools issued by a single provider.

In some embodiments, the system may identify a second web platform that hosts the target digital product tool. As an example, the system may access a digital product tool database (e.g., as part of database 120) comprising digital product tool records, each record mapping a digital product tool to a recorded web platform hosting the recorded digital product tool. Using the accessed digital product tool database, the system may identify a digital product tool record of the target digital product tool in the digital product tool database that maps the target digital product tool to a recorded web platform that is separate from the current web platform hosting the target digital product tool. In response to identifying the digital product tool record, the system may generate for display a first graphical mapping between the target digital product tool and the recorded web platform and a second graphical mapping between the target digital product tool and the current web platform hosting the target digital product tool. By doing so, the system may visually summarize the relationship between the different web platforms that host the target digital product tool.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for processing web platform source code to determine presence of one or more embedded digital product tools, the method comprising: receiving navigation information associated with a web platform hosting a target digital product tool; extracting, based on the navigation information associated with the web platform, source code of a first page of the web platform; determining, based on the source code of the first page, a hosting configuration template matching the web platform; determining, based on the hosting configuration template, navigation information for a plurality of search result pages of the web platform; for each search result page of the plurality of search result pages: extracting, based on the navigation information for the plurality of search result pages, source code of the search result page, determining that at least one search string, of a plurality of search strings associated with the target digital product tool, is included in the source code of the search result page, and identifying a first provider of the target digital product tool based on the at least one search string; and generating for display an indication of the target digital product tool and the identified first provider.
2. A method, the method comprising: extracting source code of a first page of a web platform hosting a target digital product tool; determining, based on the source code of the first page, a hosting configuration template matching the web platform; determining, based on the hosting configuration template, navigation information for a plurality of search result pages of the web platform; extracting, based on the navigation information for the plurality of search result pages, source code of a search result page; determining that at least one search string, of a plurality of search strings associated with the target digital product tool, is included in the source code of the search result page; identifying a first provider of the target digital product tool based on the at least one search string; and generating for display an indication of the target digital product tool and the identified first provider.
3. A method, the method comprising: extracting source code of a first page of a web platform hosting a target digital product tool; determining, based on the source code of the first page, a hosting configuration template matching the web platform; determining, based on the hosting configuration template, a set of link templates for a plurality of search result pages of the web platform; extracting, based on the set of link templates for the plurality of search result pages, source code of a search result page; determining that a search string associated with the target digital product tool is included in the source code of the search result page;

identifying a first provider of the target digital product tool based on the search string; and generating for display an indication of the identified first provider.

4. The method of any one of the preceding embodiments, further comprising identifying an embedded source code of the target digital product tool in source code of a second page of the web platform; determining a set of embedded web features of the target digital product tool based on the embedded source code; and generating for display a graphical mapping between the identified first provider and the set of embedded web features.

5. The method of any one of the preceding embodiments, further comprising identifying a second provider of the target digital product tool separate from the identified first provider based on the at least one search string; identifying an embedded source code of the target digital product tool in source code of a second page of the web platform; determining first and second sets of embedded web features of the target digital product tool based on the embedded source code, wherein the first set of embedded web features is associated with the identified first provider, and wherein the second set of embedded web features is associated with the identified second provider; and generating for display a first graphical mapping between the identified first provider and the first set of embedded web features and a second graphical mapping between the identified second provider and the second set of embedded web features.

6. The method of any one of the preceding embodiments, further comprising accessing a provider database comprising a plurality of provider records, wherein each provider record maps an identified provider to a recorded digital product tool; identifying a provider record of the identified first provider in the provider database, wherein the provider record maps the identified first provider to a first recorded digital product tool; and generating for display a first graphical mapping between the identified first provider and the target digital product tool and a second graphical mapping between the identified first provider and the first recorded digital product tool.

7. The method of any one of the preceding embodiments, further comprising accessing a digital product tool database comprising digital product tool records, wherein each digital product tool record maps a digital product tool to a recorded web platform hosting the recorded digital product tool; identifying a digital product tool record of the target digital product tool in the digital product tool database, wherein the digital product tool record maps the target digital product tool to a first recorded web platform that is separate from the web platform hosting the target digital product tool; and generating for display a first graphical mapping between the target digital product tool and the first recorded web platform and a second graphical mapping between the target digital product tool and the web platform hosting the target digital product tool.

8. The method of any one of the preceding embodiments, wherein the set of embedded web features of the target digital product tool enables the target digital product tool to interact with a user interface of the web platform.

9. The method of any one of the preceding embodiments, wherein the embedded source code of the target digital product tool included in the second page of the web platform is issued by the identified first provider.

10. The method of any one of the preceding embodiments, wherein the set of embedded web features includes a communication interface, a search result filter, a database search, a digital item comparison and evaluation tool, an exchange authenticator, a web platform navigation assistant, an alert notification tool, or any combination thereof.

11. The method of any one of the preceding embodiments, wherein the hosting configuration template includes a set of link templates associated with one or more pages hosted on the web platform, and wherein the one or more pages include the plurality of search result pages.

12. The method of any one of the preceding embodiments, wherein the plurality of search strings associated with the target digital product tool includes an identification number, a source code variable name, an official name, a category, an embedded feature description, a set of metadata tags, profile information of the identified first provider, or any combination thereof.

13. One or more tangible, non-transitory, computer-readable media storing instructions that, when executed by a data processing apparatus, cause the data processing apparatus to perform operations comprising those of any of embodiments 1-12.

14. A system comprising one or more processors; and memory storing instructions that, when executed by the processors, cause the processors to effectuate operations comprising those of any of embodiments 1-12.

15. A system comprising means for performing any of embodiments 1-12.

What is claimed is:

1. A system for processing web platform source code to determine presence of one or more embedded digital product tools, the system comprising:

one or more processors; and one or more non-transitory computer-readable media storing instructions that, when executed by the one or more processors, cause the one or more processors to perform operations comprising:

receiving navigation information associated with a web platform hosting a target digital product tool;

extracting, based on the navigation information associated with the web platform hosting the target digital product tool, source code of a first page of the web platform;

determining, based on the source code of the first page of the web platform, a hosting configuration template matching the web platform;

determining, based on the hosting configuration template, navigation information for a plurality of search result pages of the web platform;

for each search result page of the plurality of search result pages of the web platform:

extracting, based on the navigation information for the plurality of search result pages of the web platform, source code of the search result page;

determining that at least one search string of a plurality of search strings associated with the target digital product tool is included in the source code of the search result page; and identifying a first provider of the target digital product tool based on the at least one search string of the plurality of search strings;

generating, in a user interface of the web platform, a graphical user interface indication of the target digital product tool and the identified first provider of the target digital product tool; and modifying, in the user interface of the web platform, the graphical user interface indication of the target digital product tool and the identified first provider of the target digital product tool based on a user-specified command.

2. A method for processing web platform source code to determine presence of one or more embedded digital product tools, the method comprising:

receiving navigation information associated with a web platform hosting a target digital product tool;

extracting, based on the navigation information associated with the web platform hosting the target digital product tool, source code of a first page of the web platform;

determining, based on the source code of the first page of the web platform, a hosting configuration template matching the web platform;

determining, based on the hosting configuration template, navigation information for a plurality of search result pages of the web platform;

for each search result page of the plurality of search result pages of the web platform:

extracting, based on the navigation information for the plurality of search result pages of the web platform, source code of the search result page;

determining that at least one search string of a plurality of search strings associated with the target digital product tool is included in the source code of the search result page; and identifying a first provider of the target digital product tool based on the at least one search string of the plurality of search strings;

generating, in a user interface of the web platform, a graphical user interface indication of the target digital product tool and the identified first provider of the target digital product tool; and modifying, in the user interface of the web platform, the graphical user interface indication of the target digital product tool and the identified first provider of the target digital product tool based on a user-specified command.

3. The method of claim 2, further comprising:

identifying an embedded source code of the target digital product tool included in a second page of the web platform;

determining a set of embedded web features of the target digital product tool based on the embedded source code of the target digital product tool; and generating, in the user interface of the web platform, a graphical mapping between the identified first provider of the target digital product tool and the set of embedded web features of the target digital product tool.

4. The method of claim 3, wherein the set of embedded web features of the target digital product tool enables the target digital product tool to interact with the user interface of the web platform.

5. The method of claim 3, wherein the embedded source code of the target digital product tool included in the second page of the web platform is issued by the identified first provider of the target digital product tool.

6. The method of claim 3, wherein the set of embedded web features of the target digital product tool includes a communication interface, a search result filter, a database search, a digital item comparison and evaluation tool, an exchange authenticator, a web platform navigation assistant, an alert notification tool, or any combination thereof.

7. The method of claim 2, further comprising:

identifying a second provider of the target digital product tool separate from the identified first provider of the target digital product tool based on the at least one search string of the plurality of search strings;

identifying an embedded source code of the target digital product tool in source code of a second page of the web platform;

determining first and second sets of embedded web features of the target digital product tool based on the embedded source code of the target digital product tool, wherein the first set of embedded web features of the target digital product tool is associated with the identified first provider of the target digital product tool, and wherein the second set of embedded web features of the target digital product tool is associated with the identified second provider of the target digital product tool; and generating, in the user interface of the web platform, a first graphical mapping between the identified first provider of the target digital product tool and the first set of embedded web features of the target digital product tool and a second graphical mapping between the identified second provider of the target digital product tool and the second set of embedded web features of the target digital product tool.

8. The method of claim 2, further comprising:

accessing a provider database comprising a plurality of provider records, wherein each provider record of the plurality of provider records maps an identified provider of the target digital product tool to a recorded digital product tool;

identifying a provider record of the identified first provider of the target digital product tool in the provider database, wherein the provider record maps the identified first provider of the target digital product tool to a first recorded digital product tool; and generating, in the user interface of the web platform, a first graphical mapping between the identified first provider of the target digital product tool and the target digital product tool and a second graphical mapping between the identified first provider of the target digital product tool and the first recorded digital product tool.

9. The method of claim 8, further comprising:

accessing a digital product tool database comprising a plurality of digital product tool records, wherein each digital product tool record of the plurality of digital product tool records maps a digital product tool to a recorded web platform hosting the recorded digital product tool;

identifying a digital product tool record of the target digital product tool in the digital product tool database, wherein the digital product tool record maps the target digital product tool to a first recorded web platform that is separate from the web platform hosting the target digital product tool; and generating, in the user interface of the web platform, a first graphical mapping between the target digital product tool and the first recorded web platform and a second graphical mapping between the target digital product tool and the web platform hosting the target digital product tool.

10. The method of claim 2, wherein the hosting configuration template includes a set of web link templates associated with one or more pages hosted on the web platform, and wherein the one or more pages include the plurality of search result pages of the web platform.

11. The method of claim 2, wherein the plurality of search strings associated with the target digital product tool include an identification number, a source code variable name, an official name, a category, an embedded feature description, a set of metadata tags, profile information of the identified first provider of the target digital product tool, or any combination thereof.

12. One or more non-transitory computer-readable media storing instructions that, when executed by one or more processors, cause the one or more processors to perform operations comprising:

receiving navigation information associated with a web platform hosting a target digital product tool;

extracting, based on the navigation information associated with the web platform hosting the target digital product tool, source code of a first page of the web platform;

determining, based on the source code of the first page of the web platform, a hosting configuration template matching the web platform;

determining, based on the hosting configuration template, a set of web link templates for a plurality of search result pages of the web platform;

for each search result page of the plurality of search result pages of the web platform:

extracting, based on the set of web link templates for the plurality of search result pages of the web platform, source code of the search result page;

determining that at least one search string of a plurality of search strings associated with the target digital product tool is included in the source code of the search result page; and identifying a first provider of the target digital product tool based on the at least one search string of the plurality of search strings;

generating, in a user interface of the web platform, a graphical user interface indication of the target digital product tool and the identified first provider of the target digital product tool; and modifying, in the user interface of the web platform, the graphical user interface indication of the target digital product tool and the identified first provider of the target digital product tool based on a user-specified command.

13. The one or more non-transitory computer-readable media of claim 12, the instructions, when executed by the one or more processors, cause the one or more processors to perform further operations comprising:

identifying an embedded source code of the target digital product tool included in a second page of the web platform;

determining a set of embedded web features of the target digital product tool based on the embedded source code of the target digital product tool; and generating, in the user interface of the web platform, a graphical mapping between the identified first provider of the target digital product tool and the set of embedded web features of the target digital product tool.

14. The one or more non-transitory computer-readable media of claim 13, wherein the set of embedded web features of the target digital product tool enables the target digital product tool to interact with the user interface of the web platform.

15. The one or more non-transitory computer-readable media of claim 13, wherein the embedded source code of the target digital product tool included in the second page of the web platform is issued by the identified first provider of the target digital product tool.

16. The one or more non-transitory computer-readable media of claim 13, wherein the set of embedded web features of the target digital product tool includes a communication interface, a search result filter, a database search, a digital item comparison and evaluation tool, an exchange authenticator, a web platform navigation assistant, an alert notification tool, or any combination thereof.

17. The one or more non-transitory computer-readable media of claim 12, the instructions, when executed by the one or more processors, cause the one or more processors to perform further operations comprising:

identifying a second provider of the target digital product tool separate from the identified first provider of the target digital product tool based on the at least one search string of the plurality of search strings;

identifying an embedded source code of the target digital product tool in source code of a second page of the web platform;

determining first and second sets of embedded web features of the target digital product tool based on the embedded source code of the target digital product tool, wherein the first set of embedded web features of the target digital product tool is associated with the identified first provider of the target digital product tool, and wherein the second set of embedded web features of the target digital product tool is associated with the identified second provider of the target digital product tool; and generating, in the user interface of the web platform, a first graphical mapping between the identified first provider of the target digital product tool and the first set of embedded web features of the target digital product tool and a second graphical mapping between the identified second provider of the target digital product tool and the second set of embedded web features of the target digital product tool.

18. The one or more non-transitory computer-readable media of claim 12, the instructions, when executed by the one or more processors, cause the one or more processors to perform further operations comprising:

accessing a provider database comprising a plurality of provider records, wherein each provider record of the plurality of provider records maps an identified provider of the target digital product tool to a recorded digital product tool;

identifying a provider record of the identified first provider of the target digital product tool in the provider database, wherein the provider record maps the identified first provider of the target digital product tool to a first recorded digital product tool; and generating, in the user interface of the web platform, a first graphical mapping between the identified first provider of the target digital product tool and the target digital product tool and a second graphical mapping between the identified first provider of the target digital product tool and the first recorded digital product tool.

19. The one or more non-transitory computer-readable media of claim 18, the instructions, when executed by the one or more processors, cause the one or more processors to perform further operations comprising:

accessing a digital product tool database comprising a plurality of digital product tool records, wherein each digital product tool record of the plurality of digital product tool records maps a digital product tool to a recorded web platform hosting the recorded digital product tool;

identifying a digital product tool record of the target digital product tool in the digital product tool database, wherein the digital product tool record maps the target digital product tool to a first recorded web platform that is separate from the web platform hosting the target digital product tool; and generating, in the user interface of the web platform, a first graphical mapping between the target digital product tool and the first recorded web platform and a second graphical mapping between the target digital product tool and the web platform hosting the target digital product tool.

20. The one or more non-transitory computer-readable media of claim 12, wherein the plurality of search strings associated with the target digital product tool include an identification number, a source code variable name, an official name, a category, an embedded feature description, a set of metadata tags, profile information of the identified first provider of the target digital product tool, or any combination thereof.

* * * * *